April 17, 1951 E. SCHWEITZER 2,549,246

DISK RECORD FEED MECHANISM

Filed June 24, 1949 2 Sheets-Sheet 1

INVENTOR.

Erich Schweitzer

BY

Popp and Popp

Attorneys.

April 17, 1951 E. SCHWEITZER 2,549,246
DISK RECORD FEED MECHANISM
Filed June 24, 1949 2 Sheets-Sheet 2
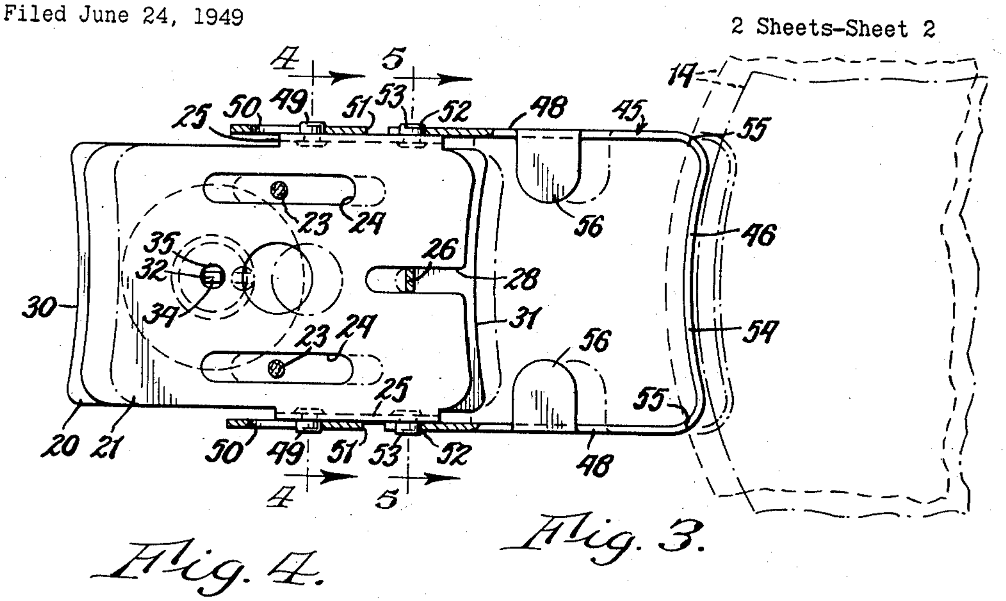
Fig. 3.
Fig. 4.
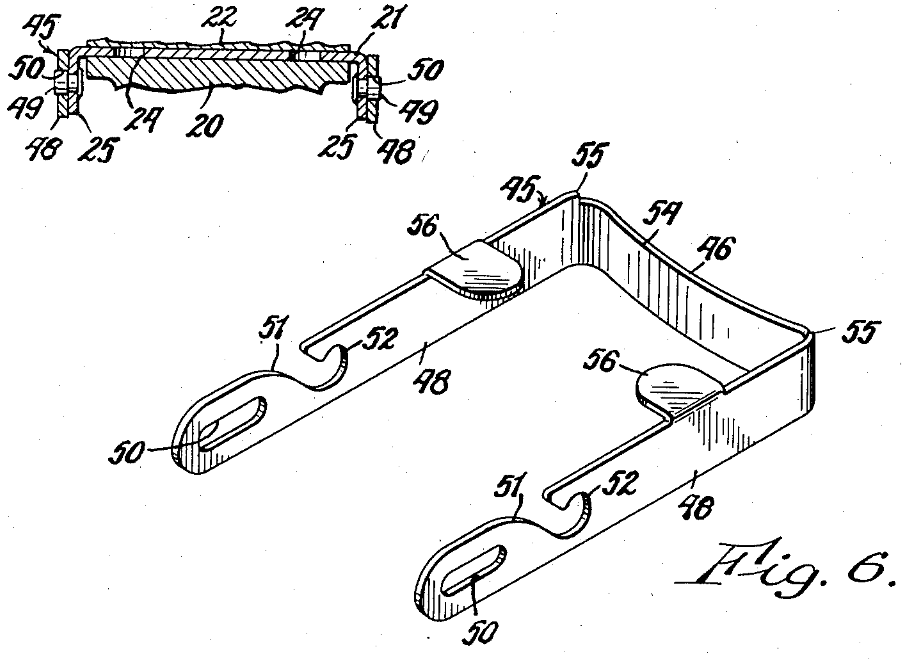
Fig. 4. Fig. 6.
Fig. 5.
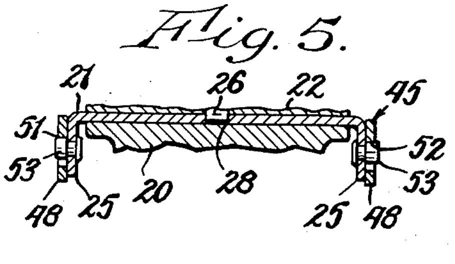
INVENTOR.
Erich Schweitzer
BY
Popp and Popp
Attorneys.

Patented Apr. 17, 1951 2,549,246

UNITED STATES PATENT OFFICE 2,549,246

DISK RECORD FEED MECHANISM

Erich Schweitzer, Buffalo, N. Y., assignor to Markel Electric Products, Inc., Buffalo, N. Y., a corporation of New York Application June 24, 1949, Serial No. 101,187

3 Claims. (Cl. 274—10)

This invention relates to a disk record feed mechanism for automatic record changers and more particularly to such a feed mechanism which moves the lowermost record of a stack of records in a planar direction to free it from a seat on a stationary center post to permit it to fall by gravity to a revolving turntable.

One of the principal objects of the present invention is to provide an extremely simple feed mechanism of this character which can be adjusted to feed records of three different sizes.

Another object is to provide such a feed mechanism which can readily be adjusted by one having little mechanical skill.

Another object is to provide such a feed mechanism which is positive and reliable in operation and will not get out of order under conditions of severe and constant use.

Other objects and advantages will appear from the following description and drawings in which:

Fig. 3 is an enlarged horizontal section taken on line 3—3, Fig. 2.

Figs. 4 and 5 are fragmentary vertical sections taken on the correspondingly numbered lines on Fig. 3.

Fig. 6 is a perspective view of the bail forming a part of the present invention.

Figure 1:
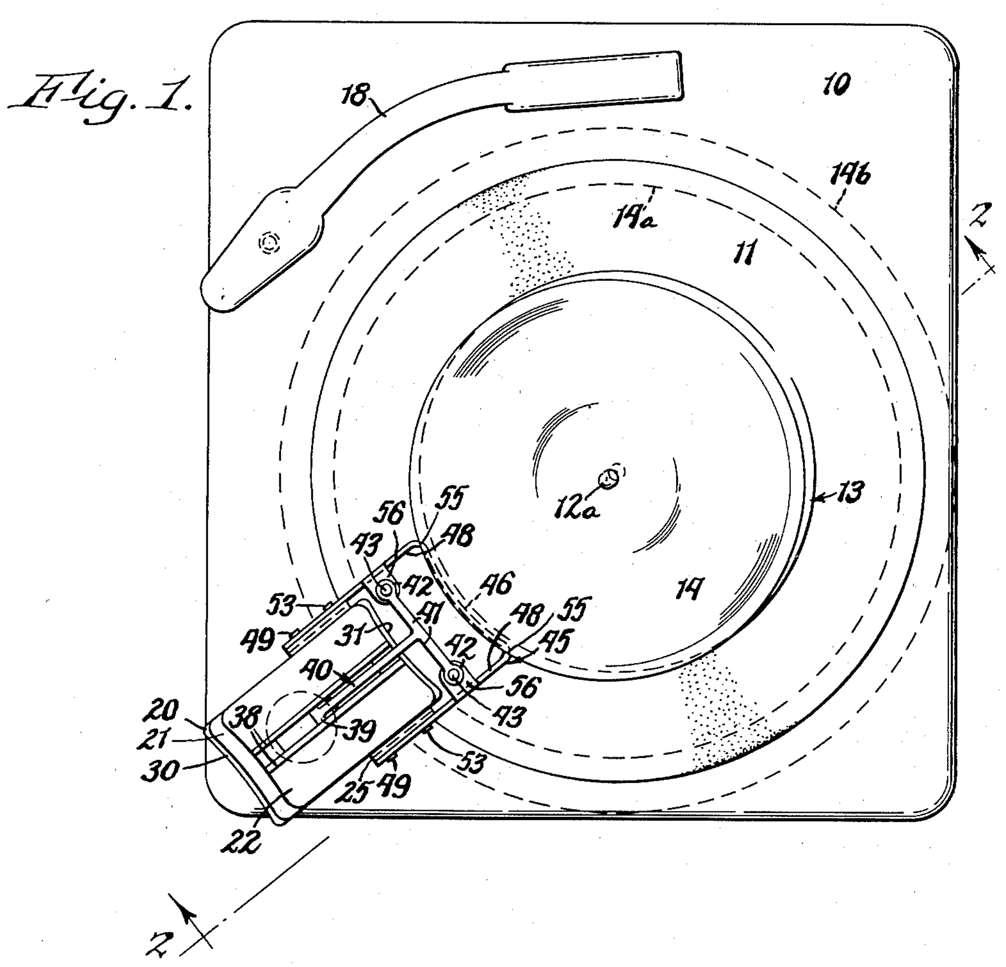
Fig. 1 is a top plan view of a record changer embodying the present invention.

The invention is illustrated in conjunction with a conventional record changer having a base plate 10 carrying a turntable 11 which revolves around a stationary center post 12 adapted to carry a stack 13 of disk records, those shown in full lines and designated at 14 being of the smallest size or diameter, and two larger sizes of records, indicated at 14*a* and 14*b* by dotted lines, also being capable of being supported by the center post 12. For this purpose the disk records are threaded on the center post 12 through their center holes and the upper end 12*a* of the center post is offset laterally to provide an upwardly facing seat 15 on one side of the center post and a downwardly facing shoulder 16 on the opposite side thereof, the vertical spacing of the seat 15 and shoulder 16 relative to each other being approximately equal to the thickness of the records. It will be seen that by moving the lowermost record in a planar direction from a coaxial relation with the upper offset part 12*a* of the center post to coaxial relation with the lower part thereof, the lowermost record will be displaced from the seat 15 and fall by gravity onto the turntable 11 to be played by a tone arm 18. At the same time it will be seen that the next succeeding higher record will be constrained against planar movement with the lowermost record by the shoulder 16.

In such conventional record changers as now constructed for playing the two sizes 14*a* and 14*b* of records, the plate 10 carries, alongside the turntable 11 and on the shoulder 16 side of the center post 12, a hollow stationary post 19. On the upper end of this post is revolvably mounted an upper head 20 which is capable of being manually turned 180° to two positions for coaction with the two sizes 14*a* and 14*b* of records. For this purpose the upper flat face of the manually revolvable head carries a slide 21 which is interposed between the revolvable head 20 and a cap 22 arranged thereabove. This cap 22 is secured to the revolvable head 20 in spaced relation thereto to accommodate the slide 21 by a pair of screws or pins 23 which extend through slots 24 provided in the slide 21 parallel with its parallel sides. These parallel sides of the slide 21 are provided at corresponding ends with down turned flanges 25 which embrace the parallel sides of the revolvable head 20. These slots 24 and ears 25 thereby permit horizontal movement of the slide 21 in the direction of its major axis, the slide being guided for movement in this direction by a lip 26 arranged in a guide groove 28 extending inwardly from one end of the slide 21 along its major axis.

The manually revolvable head 20 is mounted eccentrically on the post 19 so that one end 30 thereof is arranged closer to its axis of rotation than the other end 31 thereof. In plan the edge 31 is curved to conform to the curvature of intermediate sized records 14*a* and with the head 20 turned to the position shown in Fig. 3 is located to engage the undersides of the edges of such records 14*a* supported on the center post 12 and forms an arcuate supporting shelf therefor. The edge 30 is curved to conform to the curvature of the largest sized records 14*b* and with the head 20 turned 180° from the position shown in Fig. 3 this edge 30 is located to engage the undersides of the edges of such records 14*b* supported on the center post 12 and forms an arcuate supporting shelf therefor.

The slide 21 is moved back and forth along the major axis of the supporting head 20 by a feed lever 32 housed in the post 19 and pivoted, as indicated at 33, to swing about a horizontal axis which is arranged at right angles to the major axis of the head 20 in either of its operative positions. The lever 32 is provided at its upper end with a tongue 34 projecting through a small circular hole 35 in the slide 21.

The movement of the tongue 34 on the feed lever 32 in either direction from its normal central position is sufficient to shift a record on the center post 12 from concentric relation with the upper part 12a thereof into concentric relation with its lower part. Accordingly with the head 20 rotated to the position shown in Fig. 3 and with the edge of the lowermost record of a stack of records 14a of intermediate size supported on the edge 31 thereof, when the lever 32 is oscillated it pushes the slide 21 toward the center post 12 a distance equal to the width of the seat 15 on the center post and equal to the width of the ledge provided by the head 20 adjacent its curved edge 31. This lowermost record 14a is therefore brought into alinement with the lower part of the center post 12 and, freed from the ledge 31 of the head 20, drops onto the turntable 11 to be played. At the same time the next higher record 14a of the stack is prevented from being displaced by the offset upper end 12a of the center post and drops to the lowermost position in the stack. During the retrograde movement of the lever 32, it retracts the slide from under this next higher record 14a to cause its edge to drop onto the ledge adjacent the edge 31 for a repetition of the cycle. It will be seen that with the head 20 turned 180° the ledge adjacent the edge 30 is brought into operation for the largest size records 14b and that a stack of such records 14b is dropped one at a time from the seat 15 on the center post each time the slide 21 is reciprocated by the lever 32.

In order to hold the edge of the stack of records 14a or 14b firmly on the ledge adjacent the edge 31 or 30 respectively, the cap 22 is provided with a pair of upstanding flanges 38 spaced along opposite sides of the major axis of the head 20 and between which is pivoted, as indicated at 39, one end of a holddown arm 40. The free end of this arm is T-shaped and the outer end of each branch 41 thereof carries a cylindrical part 42 which in the generally horizontal position of the holddown arm is arranged generally vertically. Each of these cylindrical parts 42 is tipped with a piece of rubber 43 or the like. With the intermediate size records 14a supported on the ledge adjacent the edge 31 of the head, on swinging the holddown arm 40 toward the position shown in Fig. 3 the corresponding rubber tips 43 will engage the topmost record 14a of the stack and steady the entire stack of such records supported on the center post seat 15. Similarly on turning the head 180° and swinging the holddown arm 40 in the opposite direction the corresponding rubber tips 43 will engage the topmost record 14b of the stack of largest records and steady the entire stack of such records supported on the center post seat 15.

The present invention is concerned with adapting such a conventional record feed mechanism for large and intermediate size records 14b and 14a to the smallest size records 14 and to drop these smallest size records one at a time from the center post seat 15 in the same manner.

To this end a U-shaped bail or extension member 45 is provided which is made of a strip of metal bent to provide a cross part 46 and side arms 48, the cross part 46 being curved to conform to the curvature of the smallest records 14 and the side arms being spaced to straddle the depending flanges 25 of the slide 21 and to which they are pivoted by alining pivot pins 49. The pivot pins 49 extend through longitudinal slots 50 in the side arms 48 so that these side arms can be moved longitudinally with reference to these pivot pins. The side arms 48 are also each provided with a slot 51 which extends downwardly from its upper edge, thence toward the cross part 46, and thence upwardly as indicated at 52 toward its upper edge.

These slots 51 are arranged to engage supporting pins 53 projecting horizontally outward from the forward ends of the depending flanges 25 of the slide 21.

The upper edge 54 of the cross part 46 is depressed a record thickness relative to the upper edges of the side arms 48 thereby to provide shoulders 55 at the ends of the side arms 48 adapted to engage and push the lowermost record 14 from the stack 13. The side arms 48 are also provided with inwardly projecting ears 56 which are arranged to support the rubber tips 43 of the hold down arm 40 when in the position shown in Figs. 1 and 2.

Figure 2:
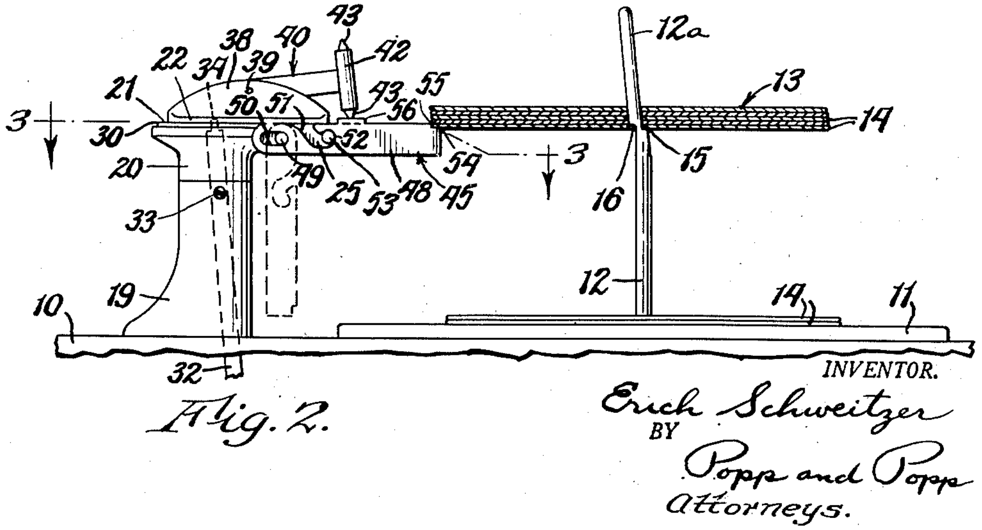
Fig. 2 is a fragmentary side elevational view thereof and showing the records in section.

To place the bail 45 in operative position it is swung up from the dotted line position shown in Fig. 2. This brings the open ends of the slots 51 in line with the supporting pins 53 on the depending flanges 25 of the slide 21. These pins 53 therefore enter these slots 51 and the bail is then moved horizontally away from the center post 12 so that these pins 53 follow the slots 51 and lodge in the upturned forward ends 52 thereof. This horizontal movement of the bail is permitted by the slots 50 thereof and when lodged in the upturned ends 52 of the slots 51 the reciprocation of the slide 21, through the supporting pins 53 causes a corresponding reciprocation of the horizontally held bail 45. The holddown arm 40 can be let down on the ears 56 of the bail.

The stack of smallest size records 14 can then be threaded over the offset upper end 12a of the center post 12. The lowermost of these records then seats, at its center hole, on the center post seat 15, and, at its edge, on the depressed edge 54 of the cross part 46 of the bail and in opposed relation to the shoulders 55 thereof. Accordingly on each reciprocation of the slide 21 the bail 45 is moved toward the center post 12 thereby to cause its shoulders 55 to engage the edge of the lowermost record 14 and displace it into alinement with the lower part of the center post 12 so that it is freed from the center post shoulder 15 and falls to the turntable 11. On the retrograde movement of the slide 21 and bail 45 the shoulders 55 are withdrawn from under the now lowermost record of the stack ready for another record change cycle.

When the record changer is being used with the intermediate and largest size records 14a and 14b the bail 45 is freed from the supporting pins 53 and permitted to hang in the inoperative position shown by dotted lines in Fig. 2.

From the foregoing it will be seen that the present invention accomplishes the various objectives stated with a very simple and inexpensive modification of a conventional record changer designed to handle only two sizes of records.

I claim:

1. In a record changer having a turntable, a stationary center post rising from the center of said turntable and having an upwardly facing seat adapted to support the lowermost of a stack of records adjacent its center hole, a supporting post located on the side of said turntable remote from said seat, a horizontal slide on said post and reciprocable longitudinally toward and from said center post, and means for reciprocating said slide, the combination therewith of means for rendering said slide operative for small size records, comprising a U-shaped member having a cross part and a pair of arms each having a longitudinal slot at one end, pivot pins projecting from said slide into said slots and permitting said U-shaped member to swing about a horizontal axis arranged transversely of the line of movement of said slide and permitting movement of said U-shaped member lengthwise of said arms, and a supporting pin projecting from said slide parallel with one of said pivot pins and arranged to enter a slot provided in the corresponding one of said arms, said last slot extending from its open end in a direction parallel with said first slots and toward said center post whereby upon swinging said U-shaped member toward said center post and to a horizontal position to bring said supporting pin into said last slot and then moving said U-shaped member horizontally away from said center post, said supporting pin releasably supports said U-shaped member in a horizontal position extending toward said center post, the upper edge of said cross part, in said horizontal position of said U-shaped member being depressed relative to the upper edges of said arms to form shoulders having a height of approximately the thickness of a record and withdrawn, on retrograde movement of said slide, to a position beyond the edge of the lowermost record of said stack of small size records whereby upon forward movement of said slide and U-shaped member said shoulders push said lowermost record of said stack of small size records from the center post seat and permit it to fall by gravity to said turntable.

2. In a record changer having a turntable, a stationary center post rising from the center of said turntable and having an upwardly facing seat adapted to support the lowermost of a stack of records adjacent its center hole, a supporting post located on the side of said turntable remote from said seat, a horizontal slide on said post and reciprocable longitudinally toward and from said center post, and means for reciprocating said slide, the combination therewith of means for rendering said slide operative for small size records, comprising a U-shaped member having a cross part and a pair of arms each having a longitudinal slot at one end, pivot pins projecting from said slide into said slots and permitting said U-shaped member to swing upwardly about a horizontal axis arranged transversely of the line of movement of said slide to a horizontal position projecting toward said center post and permitting movement of said U-shaped member lengthwise of said arms, and a pair of supporting pins projecting from said slide parallel with said pivot pins and each arranged on said upward swing of said U-shaped member, to enter a slot provided in the corresponding one of said arms, said last slots being arranged between said pivot pins and center post and each extending from its open end parallel with said first slots and toward said center post and thence upwardly whereby upon swinging said U-shaped member to said horizontal position to bring said supporting pins into said last slots and then moving said U-shaped member horizontally away from said center post, said supporting pins enter the upwardly extending ends of said last slots to releasably support said U-shaped member in said horizontal position, the upper edge of said cross part, in said horizontal position of said U-shaped member, being depressed relative to the upper edges of said arms to form shoulders having a height approximately equal to the thickness of a record and withdrawn, on retrograde movement of said slide, to a position beyond the edge of the lowermost record of said stack of small size records whereby upon forward movement of said slide and U-shaped member said shoulders push said lowermost record off said stack of small size records from the center post seat and permit it to fall by gravity to said turntable.

3. In a record changer having a turntable, a stationary center post rising from the center of said turntable and having an upwardly facing seat adapted to support the lowermost of a stack of records adjacent its center hole, a supporting post located on the side of said turntable remote from said seat, a horizontal slide on said post and reciprocable longitudinally toward and from said center post, means for reciprocating said slide, a stationary cap for said post above said slide, and a holddown arm pivoted on said cap and swingable to a position to engage the uppermost of a stack of large size records on said stack, the combination therewith of means for rendering said slide operative for small size records, comprising a U-shaped member having a cross part and a pair of arms each having a longitudinal slot at one end, pivot pins projecting from said side into said slots and permitting said U-shaped member to swing upwardly about a horizontal axis arranged transversely of the line of movement of said slide to a horizontal position projecting toward said center post and permitting movement of said U-shaped member lengthwise of said arms, a pair of supporting pins projecting from said slide parallel with said pivot pins and each arranged, on said upward swing of said U-shaped member, to enter a slot provided in the corresponding one of said arms, said last slots being arranged between said pivot pins and center post and each extending from its open end parallel with said first slots and toward said center post and thence upwardly whereby upon swinging said U-shaped member to said horizontal position to bring said supporting pins into said last slots and then moving said U-shaped member horizontally away from said center post, said supporting pins enter the upwardly extending ends of said last slots to releasably support said U-shaped member in said horizontal position, the upper edge of said cross part, in said horizontal position of said U-shaped member, being depressed relative to the upper edges of said arms to form shoulders having a height approximately equal to the thickness of a record and withdrawn, on retrograde movement of said slide, to a position beyond the edge of the lowermost record of said stack of small size records whereby upon forward movement of said slide and U-shaped member said shoulders push said lowermost record off said stack of small size records from the center post seat and permit it to fall by gravity to said turntable, and an ear on said U-shaped member arranged to support said holddown arm.

ERICH SCHWEITZER.

REFERENCES CITED

The following references are of record in the file of this patent:

UNITED STATES PATENTS

| Number | Name | Date |
|---|---|---|
| 2,352,331 | Leline | June 27, 1944 |
| 2,371,362 | Small | Mar. 13, 1945 |
| 2,490,678 | Dale | Dec. 6, 1949 |